Feb. 26, 1952    L. M. FRANCIS    2,587,456
CONVERTIBLE AUTOMOBILE AND GENERAL FREIGHT
CARRYING TRAILER
Filed March 28, 1949    2 SHEETS—SHEET 1
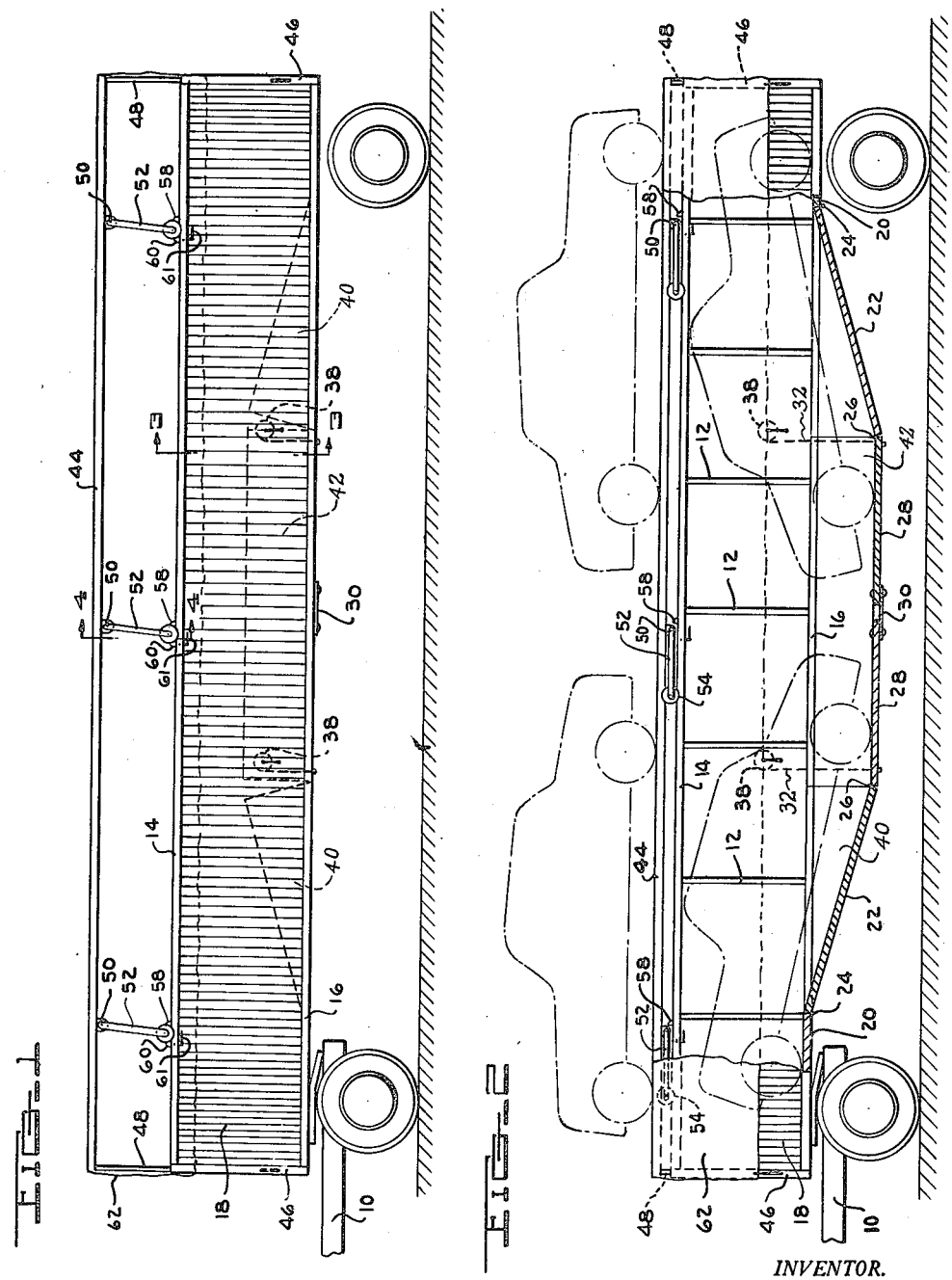
*INVENTOR.*
LYNN M. FRANCIS
BY
*Arthur M. Smith*
ATTORNEY Feb. 26, 1952            L. M. FRANCIS            2,587,456
CONVERTIBLE AUTOMOBILE AND GENERAL FREIGHT
CARRYING TRAILER
Filed March 28, 1949                                     2 SHEETS—SHEET 2
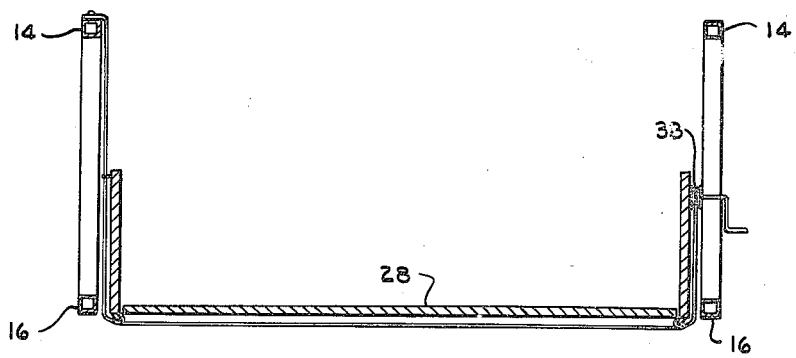
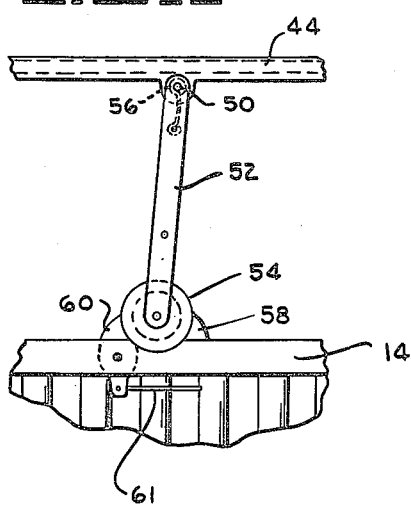 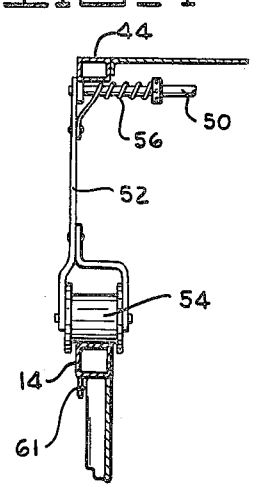
INVENTOR.
LYNN M. FRANCIS
BY
ATTORNEY Patented Feb. 26, 1952

2,587,456

UNITED STATES PATENT OFFICE 2,587,456

CONVERTIBLE AUTOMOBILE AND GENERAL FREIGHT CARRYING TRAILER

Lynn M. Francis, Detroit, Mich.

Application March 28, 1949, Serial No. 83,949

8 Claims. (Cl. 296—1)

This invention relates to a cargo trailer and more particularly to a convertible trailer in which the same may be adapted for automobile transportation, when body portions thereof are in one position and for freight transportation when the body portions are in another position.

Heretofore trailers or vehicles have been especially constructed for hauling a number of automobiles, automobile bodies or chassis and are generally of open frame construction intended to support rather than enclose the automobiles. Such constructions, while suited for automobile transportation, are unsatisfactory for transporting articles in the form of packages, constituting the bulk of freight shipments, where compact storage and enclosure means are required.

Automobile transportation is generally a oneway haul from the factory to the distributor, and the trailer is returned unloaded because it is not suited for general freight requiring delivery at a point where the trailer is returned, or along the route of travel.

It is an important object of this invention to provide a trailer having body parts so constructed and arranged that the trailer may be used for loading and transporting a multiple number of automobiles and be readily converted into a large enclosed van for hauling cargo which is completely covered and shielded from the weather.

Another object of the invention is to provide a trailer having a drop center floor section which provides oppositely disposed ramp sections for positioning the automobiles in an angular plane when the trailer is used for hauling automobiles and which may be quickly and easily converted to a flat floor construction for hauling cargo such as packages and the like.

A further object of the present invention is to provide a vertically movable roof section which serves as a supporting floor when in its lowered position, for supporting a group of automobiles above a first group on the drop center floor section and when raised, is adapted to form an enlarged cargo compartment.

A further object of the invention is to provide a roof structure which can be raised or lowered quickly and easily from an automobile hauling trailer to a spacious, covered freight trailer and vice versa. More specifically stated, the invention relates to spring loaded cross arms for assisting the load required to raise the roof section and the provision of rollers cooperating with a track to facilitate movement, thus eliminating much of the cost of expensive lifting means such as hydraulic equipment or motor driven devices for positioning the roof section.

Other objects and advantages of the invention will more fully appear from the following description taken in connection with the accompanying drawings in which:

Fig. 1 is a side elevational view of the improved trailer construction adjusted to a position for use as a freight carrying trailer.

Fig. 2 is a view corresponding to Fig. 1, but showing the parts positioned for use as an automobile hauling trailer, parts of the wall section being broken away and the floor shown in section to disclose the interior of the trailer.

Fig. 3 is a fragmentary sectional view of the trailer, taken on line 3—3 of Fig. 1 showing the floor raising and lowering mechanism.

Fig. 4 is a fragmentary sectional view of the roof raising mechanism.

Fig. 5 is a side elevational view of Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The trailer illustrating the invention, is shown as the type adapted to be applied to a tractor 10 and embodies a supporting frame structure comprising vertical ribs 12 and horizontal frame members 14 supported by a bottom frame 16. Wall panels 18 are applied to the frame structure forming the sides of the trailer between the frame members 14 and the bottom frame 16. The front end wall may be closed and the rear end wall may be provided with a door.

The opposite end portions of the bottom frame 16 are provided with fixed floor sections 20. At the inner edges of the floor sections 20 are hinged floor sections 22 adapted to be swung from a position in the plane of the bottom frame 16 to a downwardly inclined plane. Hinge members 24 are provided for permitting this swinging movement.

The free ends of hinged floor sections are provided with hinges 26 carrying floor sections 28 which lie in a horizontal plane. The adjacent ends of the sections have a slip joint connection 30 for permitting relative horizontal movement.

In Fig. 1, the floor sections 22 and 28 are shown flush in a horizontal plane with the end sections 20, providing a smooth even floor as required in hauling freight. In Fig. 2 the floor sections 22 have been hinged to an inclined position lowering the floor sections 28 to a position below the bottom frame structure 16. During this movement and because the free ends of the floor sections 22 are moving in an arc, the intermediate floor sections 28 are drawn away from each other. This movement is permitted by the slip joint 30 maintaining the two sections 28 in a flush, horizontal plane. This position of floor sections provides loading space for automobiles in an angular position for lowering the roof of the automobiles, thus lowering the overall height.

While various devices may be used for raising and lowering the drop center sections, I have illustrated a means including cables 32 attached to the movable floor sections at points adjacent the hinges 26. The cables 32 extend upwardly to a drum 38 upon which the cables may be wound. The drum 38 may be manually rotated as by means of a crank with a dog and ratchet mechanism or may be power driven by a motor or power takeoff shaft from the tractor engine.

The floor sections 22 are provided with lateral plates 40, which may be triangular in shape, for closing the longitudinal spaces between the floor and the sidewalls when the floor sections are lowered as shown in Fig. 2. The floor sections 28 are also provided with vertical sidewalls 42 for closing the lateral spaces between the sidewalls 18 and the floor sections 28.

The roof 44 of the trailer is shown guided in the four corner posts 46 by rods 48 slidably mounted in the posts. The roof may be a closed panel or longitudinally extending track members for receiving the tires of an automobile. Cross arms 50 are carried by the floor 44 and have lateral arms 52 pivoted thereto. The free end of each arm 52 is provided with a flanged roller 54 which rides on the longitudinal frame 14 serving as a track. These arms are spring loaded in such a manner that a coil spring 56 assists in raising the roof section when the arms 52 are pulled from their position shown in Fig. 2 to a position shown in Fig. 1. The movement of the roof from the raised to the lowered position or from the lowered position to the raised position is accomplished by unbalancing this spring condition which can be readily done manually by the operator, thus eliminating much of expensive hydraulic equipment heretofore commonly employed.

Stops 58 are secured to the tracks 14 and are positioned in the path of the rollers 54 for limiting the movement of the arms 52 in a vertical direction. A plurality of movable locking dogs 60 are pivotally mounted on the frame or track 14 and are actuated by the control rod 61 to be moved pivotally into and out of locking position. The stops 58 and the locking dogs 60 are arranged to hold the arms at a slight angle to the vertical so that the weight of the roof will assist in overcoming the forces of the springs 56 when it is desired to lower the roof structure.

For automobile hauling, the roof 44 is placed in its raised position and the central drop section of the lower floor lowered. This permits the ready loading of the automobiles which can be easily driven onto the floor of the lower deck through the rear end of the trailer. The roof 44 is then lowered to the position shown in Fig. 2 and locked in this position and automobiles loaded on the roof which forms the top deck structure. This is the position of the body parts when the vehicle is being used to transport automobiles.

After the automobiles have been unloaded and it is desired to load the vehicle as a cargo carrying trailer, as for the return trip, the drop center floor sections are raised to a flush position by turning the drum 38 which shortens the length of the cables 32 drawing the floor sections 28 upwardly and pivoting the floor sections 22 about the hinges 24, the floor sections 28 moving toward each other to close the space therebetween. The arms 52 are then pivoted rearwardly raising the roof 44 away from the upper edges of the sidewalls 18. This raising operation is assisted by the previously stressed springs 56 in lowering the roof.

When the parts are positioned for hauling cargo, with the floor in flush position and the roof raised, the suitable flexible covering 62, such as the tarpaulin, is secured to the top 44 and to the body of the trailer in such a manner that its edges overlap the upper edge of the sidewall paneling 18 closing the lateral spaces between the raised roof and the sidewalls to provide a weather-tight body structure.

From the above it will be apparent that I have provided a vehicle which can be converted quickly and easily from an automobile hauling vehicle to a spacious, covered cargo vehicle which is of relatively light weight and which is simple and economical to manufacture and in which the conversion from one type of vehicle to another is easily accomplished by the operator without the addition of excess parts.

It will be understood that various changes including the size, shape and arrangement of parts may be made without departing from the spirit of my invention and it is not my intention to limit its scope other than by the terms of the appended claims.

Having thus described my invention, I claim:

1. A cargo trailer adapted for hauling either automobiles or freight, comprising a frame structure having a bottom frame, horizontal frame members vertically spaced from said bottom frame and rib members between said bottom frame and said horizontal frame members, wall panels covering said frame structure to form end and side walls, a fixed floor section at the opposite ends of said bottom frame, a vertically movable floor section between and spaced from said fixed floor sections, a floor section between said vertically movable floor section and each fixed end section pivotally supported at its opposite ends respectively to said vertically movable floor section and said end section, a vertically movable roof section supported by said frame structure and swinging arms between said roof section and said frame structure pivotally supported on one and having rolling engagement with the other for raising or lowering the roof section relative to said frame structure.

2. In a combination trailer for carrying either automobiles or general merchandise, a vehicle having side frames, supporting road wheels near the rear end, means for connecting a truck-tractor at its forward end, a lower floor, a movable center section in said floor, means for raising and lowering the center section of said floor to allow loading two automobiles on said floor, end to end, with the nearer ends substantially lower than the farther ends when said floor is lowered and to provide a substantially flat floor when in its raised position, a vertically movable upper floor which when lowered is in close proximity to the two automobiles loaded on the lower floor, and upon which two automobiles may be loaded in an end to end relationship, when raised and secured said upper floor providing the top portion of a cargo trailer, and means for completing the closure between the said top portion and the side frames of the vehicle to provide a closed cargo trailer.

3. In a cargo trailer adapted for hauling either automobiles or freight, a pair of spaced side walls, a lower floor, a movable center section in said floor to allow loading two automobiles on said floor, end to end, with the nearer ends substantially lower than the farther ends when the floor is lowered and to provide a substantially flat floor when in its raised position, a vertically movable upper floor which when lowered is in close proximity to the two automobiles loaded on the lower floor, and upon which two automobiles may be loaded in an end to end relationship, when raised and secured said upper floor providing the top portion of the cargo trailer, and means for completing the closure between said top portion and said side walls to provide a closed cargo trailer.

4. A cargo trailer adapted for hauling either automobiles or freight, comprising a floor section, side and end wall sections, a roof section vertically movable relative to said side and end wall sections, a guide to maintain said roof section in a substantially horizontal plane during said movement, said side wall sections having an upper horizontal edge providing a longitudinal track, a plurality of arms between said roof section and said wall section for supporting said roof section in spaced relation to said wall section, each of said arms being pivotally secured to said roof section for swinging about an axis fixed against movement longitudinally relative to said side wall section and in a longitudinal plane, said arms having a roller on the opposite ends thereof engaging said track, and spring means opposing the movement of said roof section toward said side section.

5. A cargo trailer adapted for hauling either automobiles or freight, comprising a floor section, side and end wall sections, a roof section vertically movable relative to said side and end wall sections, a plurality of vertical posts secured to said wall sections, a plurality of vertical rods vertically movable within said posts and secured to said roof section to maintain said roof section in a substantially horizontal plane during said vertical movement, said side wall sections having an upper horizontal edge providing a longitudinal track, a plurality of support arms between said roof section and said wall section for supporting said roof section in spaced relation to said wall section, each of said support arms having a cross arm journaled on said roof section to permit swinging of said support arm in a longitudinal plane and also having a roller on the opposite end thereof engaging said track, and spring means opposing the movement of said roof section toward said side sections and comprising a coil spring concentric with the longitudinal axis of said cross arm and having the opposite ends thereof secured to said support arm and said roof section respectively.

6. A cargo trailer in accordance with claim 5 and being further characterized in that locking means are carried on said wall section for selectively locking said support arms in an angular position when said roof is raised.

7. A cargo trailer in accordance with claim 5 and being further characterized in that said rollers are provided with flanges which engage the edges of said track and prevent lateral movement of said rollers relative to said track.

8. A cargo trailer adapted for hauling either automobiles or freight, comprising a frame structure having end and side walls, a continuous lower floor having longitudinally spaced fixed sections and an intermediate vertically movable center section, means for lowering the center section of said floor to allow loading two automobiles on said floor, end to end, with the nearer ends substantially lower than the farther ends when said floor is lowered and to provide a substantially flat floor when in its raised position, a vertically movable roof section adapted to lie in a substantially horizontal plane in either its raised or lowered position, arms pivotally supported on said roof section, rollers at the free ends of said arms for engagement with said side walls, torsion springs between said arms and said roof section, and means engaging said frame structure and affixed to said roof section for supporting said roof section in position over said frame structure when said roof section is raised or lowered.

LYNN M. FRANCIS.

REFERENCES CITED

The following references are of record in the file of this patent:

UNITED STATES PATENTS

| Number | Name | Date |
| --- | --- | --- |
| 1,229,714 | Clark et al. | June 12, 1917 |
| 1,925,665 | Judd et al. | Sept. 5, 1933 |
| 2,168,069 | Miller | Aug. 1, 1939 |

FOREIGN PATENTS

| Number | Country | Date |
| --- | --- | --- |
| 461,624 | Great Britain | Feb. 19, 1937 |
| 463,825 | Great Britain | Apr. 7, 1937 |